(12) United States Patent
Gruchala et al.

(10) Patent No.: US 8,744,052 B2
(45) Date of Patent: Jun. 3, 2014

(54) SYSTEM AND METHOD FOR DETECTING FALSE CALLER ID

(75) Inventors: Carol Gruchala, Naperville, IL (US);
Wayne Heinmiller, Elgin, IL (US);
Dianna Tiliks, Palatine, IL (US)

(73) Assignee: AT&T Intellectual Property I, L.P.,
Atlanta, GA (US)

( * ) Notice: Subject to any disclaimer, the term of this patent is extended or adjusted under 35 U.S.C. 154(b) by 2002 days.

(21) Appl. No.: 11/292,324

(22) Filed: Dec. 1, 2005

(65) Prior Publication Data

US 2007/0127658 A1    Jun. 7, 2007

(51) Int. Cl.
*H04M 1/56*     (2006.01)
*H04M 15/06*    (2006.01)

(52) U.S. Cl.
USPC .................. 379/142.05; 379/142.06

(58) Field of Classification Search
USPC ........................ 379/142.01–142.06
See application file for complete search history.

(56) References Cited

U.S. PATENT DOCUMENTS

| | | | |
|---|---|---|---|
| 5,341,414 A | 8/1994 | Popke | |
| 5,912,946 A * | 6/1999 | Michelson | 379/15.04 |
| 5,953,399 A * | 9/1999 | Farris et al. | 379/207.15 |
| 5,999,611 A | 12/1999 | Tatchell et al. | |
| 6,310,943 B1 | 10/2001 | Kowalski | |
| 6,553,109 B1 * | 4/2003 | Hussain et al. | 379/207.02 |
| 6,574,319 B2 * | 6/2003 | Latter et al. | 379/142.07 |
| 6,662,014 B1 | 12/2003 | Walsh | |
| 6,718,021 B2 | 4/2004 | Crockett et al. | |
| 6,798,868 B1 | 9/2004 | Montgomery et al. | |
| 6,876,739 B2 | 4/2005 | Bennett, III et al. | |
| 6,904,137 B2 | 6/2005 | Brandt et al. | |
| 2002/0009184 A1 * | 1/2002 | Shnier | 379/142.01 |
| 2004/0174965 A1 | 9/2004 | Brahm et al. | |

OTHER PUBLICATIONS

Search Report and Written Opinion, Oct. 19, 2007.

* cited by examiner

*Primary Examiner* — Ahmad Matar
*Assistant Examiner* — Nafiz E Hoque
(74) *Attorney, Agent, or Firm* — Cantor Colburn LLP

(57) ABSTRACT

A system and method for detecting a false caller ID. The system receives caller identification data and signaling system data from the call, compares the caller identification data to the signaling system data, and determines if the call has a false caller ID based on the comparison. The signaling system data may include signaling system 7 data. The system may also alert the intended recipient by modifying the properties of the call or by enacting a peripheral system to contact the intended recipient.

17 Claims, 4 Drawing Sheets

US 8,744,052 B2

SYSTEM AND METHOD FOR DETECTING FALSE CALLER ID

TECHNICAL FIELD

The present disclosure generally relates to a system and method for detecting a false caller ID.

BACKGROUND

Customers have come to rely on caller ID to identify who is calling them. However, some parties are taking advantage of new technology to send false caller IDs. Typically, the caller ID is automatically generated by the phone system when a call is made. However, private exchange systems such as private branch exchange (PBX) networks allow multiple phones to be connected to a single service line. Accordingly, PBX type systems have the capability to generate different caller IDs corresponding with the particular phone connected. Further, recent marketing systems have become more sophisticated and include the technology to replace caller ID information to conceal the identity of the caller. Using a regular caller ID display, customers may easily mistake who is calling them. Currently, peripheral systems such as privacy manager cannot identify a false caller ID and, therefore, will not intercept calls with a false caller ID.

DETAILED DESCRIPTION

A system is provided for detecting a false caller ID according to one embodiment of the present invention. The system identifies a false caller ID by comparing caller identification data to other signaling system data. The signaling system data may include signaling system 7 (SS7) data. The signaling system data may be correlated with information stored in a database to determine if the signaling system data is consistent with the caller identification data. The system may also alert the intended recipient by modifying the properties of the call or by enacting a peripheral system to contact the intended recipient. These and other aspects and advantages will become apparent upon reading the following in combination with the accompanying drawings.

Figure 1:
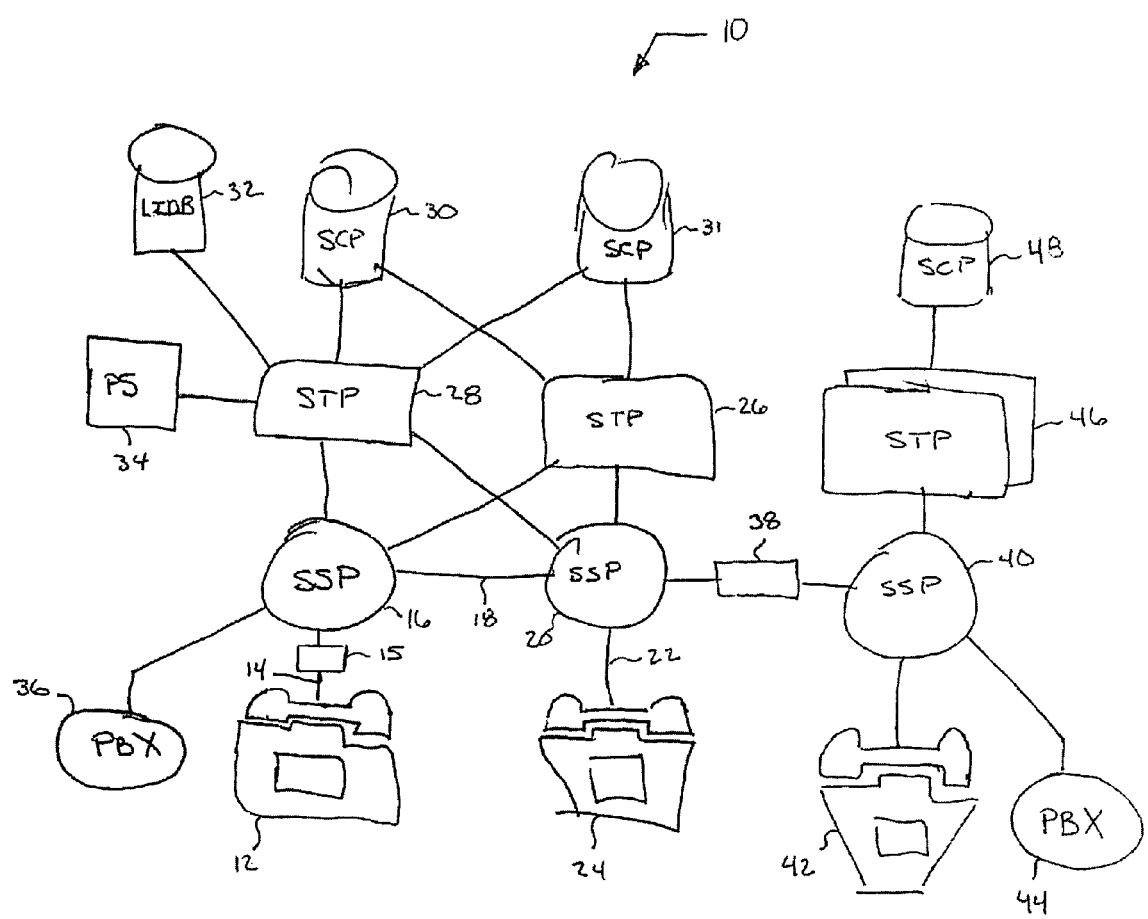
FIG. 1 is a block diagram of a telephone network in accordance with one embodiment of the present invention.

Referring to FIG. 1, a telephone network 10 is provided including the capability to identify a false caller ID. An intended call recipient such as a phone 12 is connected to the telephone network 10 over a telephone service line 14. The telephone service line 14 transmits voice data and caller identification data. The phone 12 is connected to a service switching point (SSP) through the telephone line 14. In addition, a central office switch 15 may connect the telephone line 14 to the SSP. SSPs are switches that originate, terminate, or tandem calls. An SSP sends signaling messages to other SSPs, for example SSP 20, to set up, manage, and release voice circuits required to complete a call. SSPs are typically connected via voice lines 18 forming voice trunks that handle the bulk of voice data that travels across the telephone network 10. Accordingly, a phone initiating a call, for example phone 24, would be connected to SSP 20 through a service line 22 as part of the voice trunk. A caller ID would, typically, be assigned based on the service line 22, for example, at SSP 20 or a lower level switch. The call would be routed through the voice line 18 to SSP 16 and the call connected to the recipient at phone 12 through service line 14.

An SSP may send a query message to a centralized database, such as a service control point (SCP), to determine how to route a call along the voice trunk between SSPs. The SCP can respond to the originating SSP providing appropriate routing numbers associated with the dialed number. Typically, the SSP connects with an SCP through a signal transfer point (STP). An STP is a packet switch that is generally used for routing signaling system data for a call. Accordingly, for each call a connection may be established along the voice trunk for rudimentary voice communication, while signaling information including caller ID, routing and other information is provided over a separate connection that is often packeted and routed through STPs. One implementation of a signaling system protocol is the signaling system 7 (SS7) protocol. Each signaling point in the SS7 network is uniquely identified by a numeric point code. The point codes are carried in signaling messages between signaling points to identify the source and destination of each message. Each signaling point uses a routing table to select the appropriate signaling path for each message. Accordingly, an STP routes each incoming message to an outgoing signaling link based on the routing information contained in the SS7 message. Because the STP acts as a network hub, it provides improved utilization of the voice trunks and eliminates the need for direct links between signaling points. As such, when a call is established from phone 24 to phone 12, system signaling data may be provided from SSP 20 to STP 26. STP 26 may then provide the signaling system data to SSP 16 to complete the signaling link.

Because the signaling system data is critical to call processing, STPs and SCPs generally are deployed in pairs with redundant connections allowing the same connections to be made through STP 26 as STP 28 and also providing access to either SCP 30 or 31 through both STPs 28 and 26. STPs, such as STP 28, may be in communication with other devices, such as an external database 32. For example, the external database 32 may including a line information database (LIDB) or a local number portability (LNP) database to support additional call functionality. Further, a peripheral system 34 may be in communication with STP 28 to provide voicemail or automated call management functions, such as a privacy manager system where certain numbers may be blocked or automatically forwarded to voicemail.

PBXs, such as PBX 36, can be connected directly to SSP 16. As previously mentioned, PBX 36 can provide a false caller ID to the SSP 16. Accordingly, functionality may be designed into one of the switches, for example SSP 16 or STP 28, to automatically check the caller ID information provided from PBX 36 by comparing the caller identification data with the other signaling system data. The caller identification data in the SS7 protocol includes the Address Signal Information of the Calling Party Number parameter. For example, the Address Signal Information may be compared to SS7 data including, but not limited to, the Charge Number parameter, the Jurisdictional Information Number, or other SS7 parameters. Although any of the current SS7 parameters including:

Nature of connection indicators, Forward call indicators, Calling party's category, User service information, Access transport, Application transport, Business Group, Calling geodetic location, Calling party number, Charge number, Connection request, Generic address, Generic digits, Generic name, Hop counter, Information request indicators, Jurisdiction, Operator services information, Optional Forward Call Indicators, Original called number, Originating line information, Redirect capability, Redirect counter, Redirect forward information, may be used for the comparison with each other or with the caller identification data, and more specifically the Address Signal Information within the Calling Party Number parameter, future added SS7 parameters may also be used when available. Further, other fields of the Calling Party Number including the Nature of address indicator and Numbering Plan indicator may be compared to the Address Signal Information to determine if the caller ID is false. Accordingly, the false caller ID includes where the caller identification data has been modified and does not accurately describe the call origin. For example in a SS7 system, when the Address Signal Information of the Calling Party Number parameter is modified to include a phone number or description that does not match the call origin.

Further, the switch 16 or 28 may connect to a database such as an SCP 30 or an external database 32, such as an LIDB or LNP, to retrieve information that correlates to the signaling system data. Accordingly, the retrieved data may then also be compared to the caller identification data to determine if the retrieved data is consistent with the caller identification data. If some or all of the data is inconsistent, the switch can alter the call parameters before establishing the call connection. The switch may modify the call parameters. For example, the caller ID information may be modified to correct the caller ID information, including the Address Signal Information, or provide a warning message. In addition, the switch may vary the ring to identify that the call is from an unknown source.

In another aspect of the invention, the switch may forward the call or call information to a peripheral system 34. The peripheral system 34 may be configured to store the call information for later use by the intended recipient. Or alternatively, the peripheral system 34 may actively contact the intended recipient. The peripheral system 34 may contact the intended recipient at a later time or may hold the call and contact the intended recipient with an automated voice message providing information about the call and giving the intended recipient the option of connecting the call, terminating the call, or sending the call to voicemail.

As one skilled in the art can readily understand, the telephone network 10 may also expand across multiple local and national carriers. Accordingly, a phone 42 or PBX 44 may be connected to an SSP 40. The SSP 40 may be connected to the network of the intended recipient at phone 12 through a carrier exchange switch 38. Accordingly, various information may or may not be available within the signaling system data transmitted through the carrier switch 38. Although similar situated networks will also typically include STPs, such as STP 46, and SCPs, such as SCP 48, that may be connected to the network of the intended recipient through various means. Accordingly, one of ordinary skill in the art can see that in more complex networks, the present invention may be implemented at various switch points including SSPs 16, 20, and 40 or STPs 28, 26, or 46, as well as other switches within the network, such as central office switch 15, prior to the switch establishing a call connection to the intended recipient at the phone 12. In one embodiment, the switch may be located between the phone 12 of the intended recipient and the PSTN or other general networks, such as a VOIP network. Although it is clearly understood that the switch may be readily implemented at virtually any switch point in the network depending on the network topology.

Figure 2:
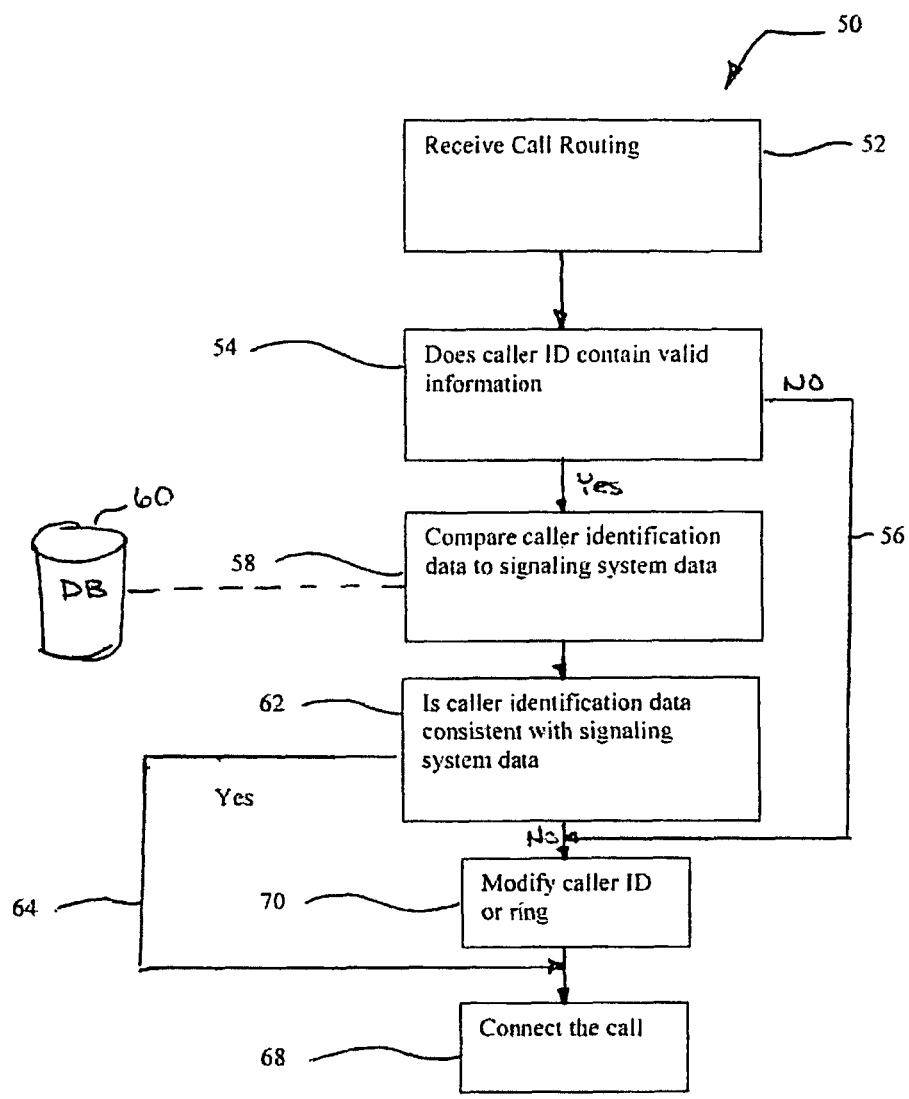
FIG. 2 is a block diagram of a method for detecting a false caller ID.

Now referring to FIG. 2, a method 50 is provided to identify a false caller ID. In block 52, a call routing signal is received including caller identification data and signaling system data. In block 54, the analyzes the caller ID to determine if the caller identification data contains valid information. For example, the caller ID may be analyzed at any switch or in a peripheral system. If the caller identification data does not include valid information, the logic flows along line 56 and the call may be provided to a peripheral system to be terminated or connected to the end user. If the caller identification data does contain valid information, the logic flows to block 58 and the system compares the caller identification data to the signaling system data. As denoted by block 60, data may be retrieved from an external database such as an LIDB, LNP, or other SCP based on the signaling system data. The retrieved data is then compared to the caller identification data. In block 62, the system determines if the caller identification data is consistent with the signaling system data and/or consistent with the data retrieved from the database in accordance with the signaling system data. If the data is consistent, the logic flows along line 64 to block 68 and the call is connected. If the data is not consistent, in a first embodiment the logic flows to block 70 where the system modifies the caller identification data, for example, modifies the caller number to all nines or incorporates a warning message in the caller name. Further, the system may modify the ring of the call, for example by changing the ring tone, ring frequency, or ring sequence to warn the user of the false caller ID information. Then the call is connected to the intended recipient, as denoted by block 68.

Figure 3:
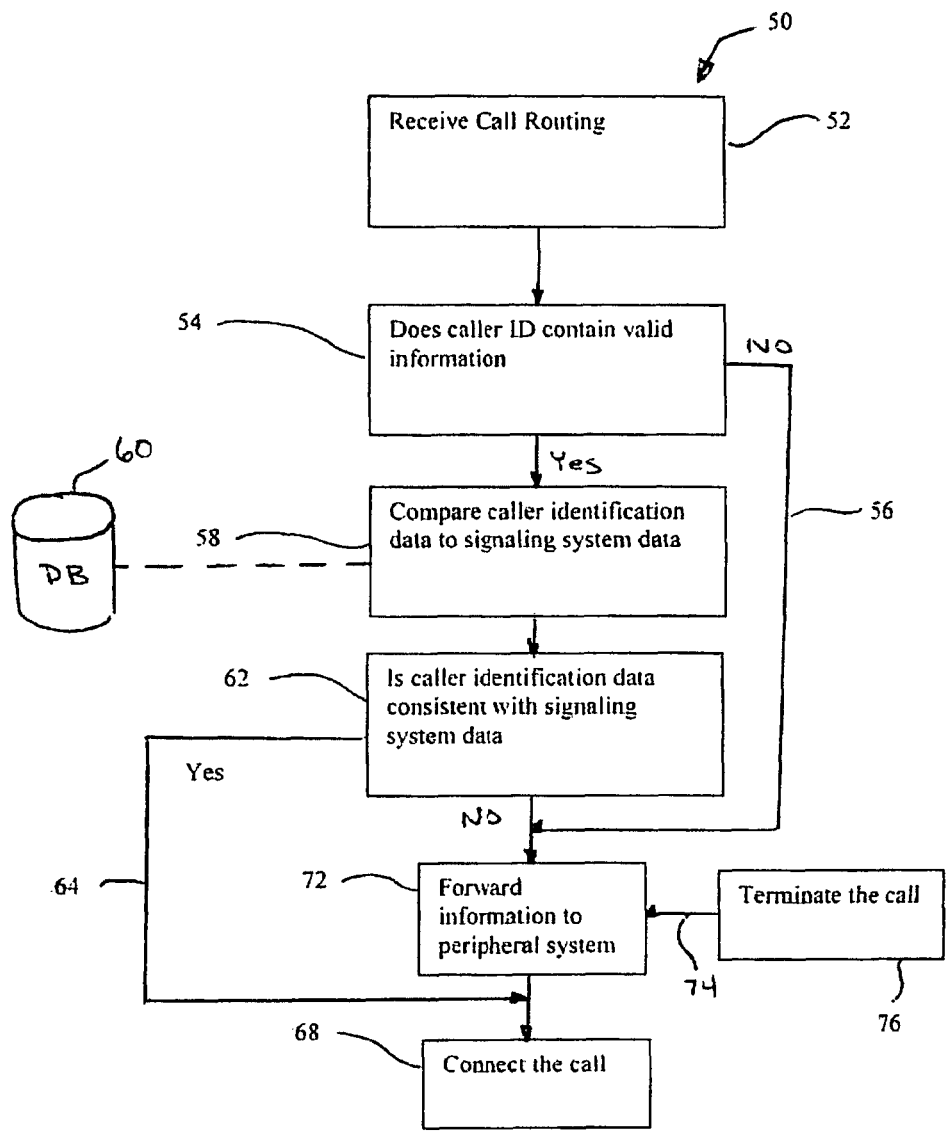
FIG. 3 is a block diagram of another method for detecting a false caller ID.

In another embodiment of the present invention and illustrated in FIG. 3, if the data is not consistent in block 62, the data and/or call is forwarded to a peripheral system as denoted in block 72. Depending on the configuration of the peripheral system, the information may be stored and accessed by the user at a later time and the call is terminated. Or alternatively, the system may contact the user and provide the user the option to selectively connect the call, send the call to voicemail, or terminate the call. If the user selects to connect the call, logic flows along line 74 to block 68 and the call is connected. If the user decides to terminate the call, the logic flows along block 76 and the call is terminated.

Figure 4:
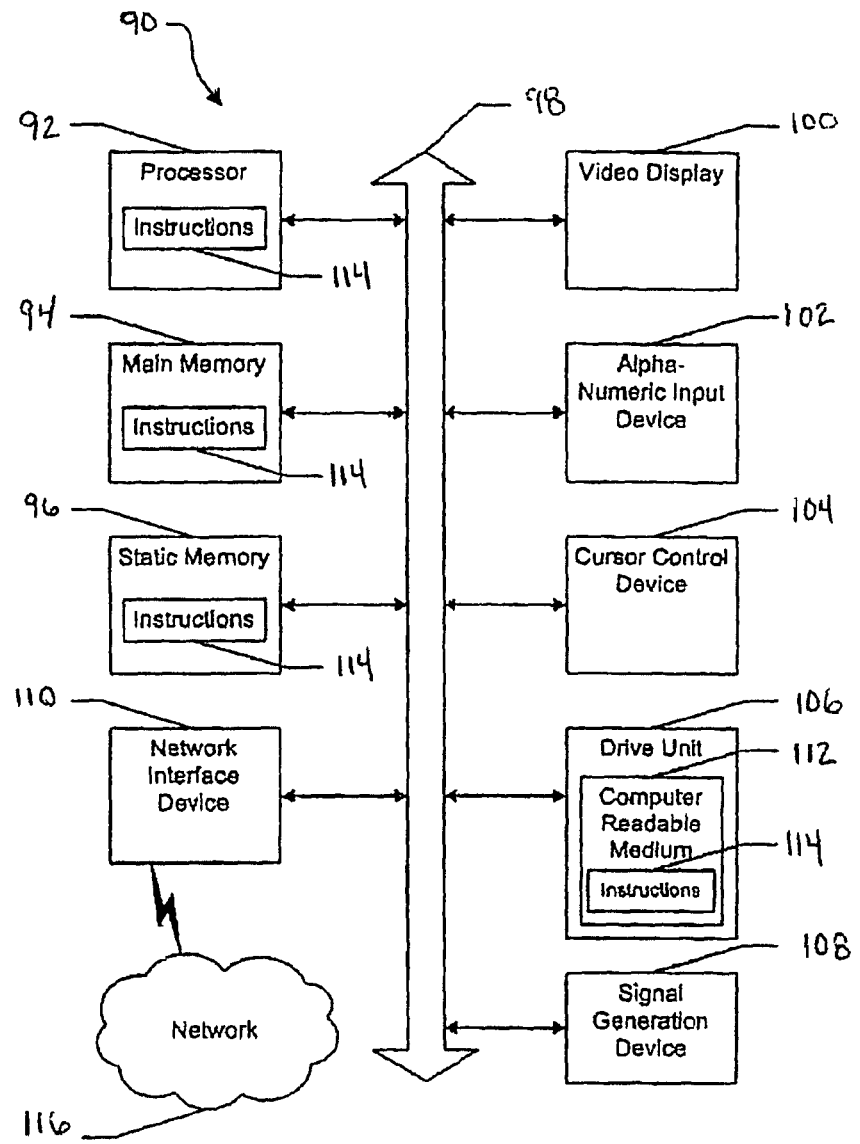
FIG. 4 is a block diagram of a general computer system.

Any of the switches including any of the SSPs, STPs, central office switches or peripheral systems may be a general computer system as shown in FIG. 4 and designated at reference numeral 90. The computer system 90 can include a set of instructions that can be executed to cause the computer system 90 to perform any one or more of the methods or computer based functions disclosed herein. The computer system 90 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 90 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 90 can be implemented using electronic devices that provide voice, video or data communication. Further, while a single computer system 90 is illustrated, the term "system" shall also be taken to include any collection of systems or sub-systems that individually or jointly execute a set, or multiple sets, of instructions to perform one or more computer functions.

As illustrated in FIG. 4, the computer system 90 may include a processor 92, e.g., a central processing unit (CPU), a graphics processing unit (GPU), or both. Moreover, the computer system 90 can include a main memory 94 and a static memory 96 that can communicate with each other via a bus 98. As shown, the computer system 90 may further include a video display unit 100, such as a liquid crystal display (LCD), an organic light emitting diode (OLED), a flat panel display, a solid state display, or a cathode ray tube (CRT). Additionally, the computer system 90 may include an input device 102, such as a keyboard, and a cursor control device 104, such as a mouse. The computer system 90 can also include a disk drive unit 106, a signal generation device 108, such as a speaker or remote control, and a network interface device 110.

In a particular embodiment, as depicted in FIG. 4, the disk drive unit 106 may include a computer-readable medium 112 in which one or more sets of instructions 114, e.g. software, can be embedded. Further, the instructions 114 may embody one or more of the methods or logic as described herein. In a particular embodiment, the instructions 114 may reside completely, or at least partially, within the main memory 94, the static memory 96, and/or within the processor 92 during execution by the computer system 90. The main memory 94 and the processor 92 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 114 or receives and executes instructions 114 responsive to a propagated signal, so that a device in communication with a network 116 can communicate voice, video or data over the network 116. Further, the instructions 114 may be transmitted or received over the network 116 via the network interface device 110.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, SIP, H.323, etc.) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

The invention claimed is:

1. A system for identifying a false caller identification provided with a call to an intended recipient, the system comprising:
   a first switch receiving caller identification data and signaling system data of the call, the first switch determining if the caller identification data includes valid information and when the caller identification data does not include valid information, the first switch providing the call to a peripheral system;
   if the caller identification data includes valid information, the first switch comparing the caller identification data to the signaling system data to identify the false caller identification if the caller identification data is not consistent with the signaling system data, the first switch providing the call to the peripheral system upon detecting false caller identification, the first switch providing the call to the intended recipient if the caller identification data is consistent with the signaling system data; and
   the peripheral system holding the call and contacting the intended recipient with an automated voice message providing information about the call and giving the intended recipient options of connecting the call, terminating the call, and sending the call to voicemail, wherein the peripheral system comprises a user interface that allows the intended recipient to selectively connect with the call, wherein the peripheral system stores the caller identification data for access by the intended recipient after the call is terminated;
   wherein the first switch modifies the caller identification data when the false caller identification is detected based on the signaling system data, the switch modifying the caller identification data to identify the presence of false caller identification;
   wherein the switch modifying the caller identification data to identify the presence of false caller identification includes modifying the caller identification data to a series of identical numbers.

2. The system of claim 1, wherein signaling system data is signaling system 7 data.

3. The system of claim 2, wherein the first switch compares the caller identification data to a jurisdiction information number.

4. The system of claim 2, wherein the first switch compares the caller identification data to a charge number.

5. The system of claim 2, wherein the first switch compares numbering plan indications with address signal information of the caller identification data to identify the false caller identification.

6. The system of claim 1, wherein the first switch is a packet switch controlling the signaling system data.

7. The system of claim 1, wherein the first switch compares the caller identification data with the signaling information before a call connection is established.

8. The system of claim 1, wherein the first switch modifies a ring of the call when the false caller identification is detected based on the signaling system data.

9. The system of claim 1, wherein the first switch is in communication with a database and compares the caller identification data with stored data in the database to detect the false caller identification.

10. The system of claim 1, wherein the first switch comprises a service switching point.

11. The system of claim 1, wherein the first switch comprises a signal transfer point.

12. The system of claim 1, wherein the first switch comprises a central office switch.

13. The system of claim 1, wherein the series of identical numbers is all nines.

14. A method for detecting a false caller identification in a call, the method comprising:
   receiving caller identification data from the call;
   receiving signaling system data from the call;
   determining if the caller identification data includes valid information and when the caller identification data does not include valid information, providing the call to a peripheral system;
   if the caller identification data includes valid information, comparing the caller identification data to the signaling system data;
   determining if the call has the false caller identification based on the comparing and providing the call to the peripheral system upon detecting false caller identification when the caller identification is not consistent with the signaling system data;
   providing the call to an intended recipient if the caller identification data is valid and is consistent with the signaling system data; and
   the peripheral system holding the call and contacting the intended recipient with an automated voice message providing information about the call and giving the intended recipient options of connecting the call, terminating the call, and sending the call to voicemail, wherein the peripheral system comprises a user interface that allows the intended recipient to selectively connect with the call, wherein the peripheral system stores the caller identification data for access by the intended recipient after the call is terminated;
   the method further comprising modifying the caller identification data when the false caller identification is detected based on the signaling system data to identify the presence of false caller identification;
   wherein modifying the caller identification data to identify the presence of false caller identification includes modifying the caller identification data to a series of identical number.

15. The method of claim 14, wherein comparing the caller identification data to the signaling system data is performed before connecting the call to the intended recipient.

16. The method of claim 14, further comprising comparing the signaling system data with stored data from a database to determine if the signaling system data is consistent with the caller identification data.

17. The method of claim 14, wherein the series of identical numbers is all nines.

* * * * *